(12) United States Patent
Sundaresan et al.

(10) Patent No.: US 11,520,866 B2
(45) Date of Patent: Dec. 6, 2022

(54) CONTROLLING PROCESSOR INSTRUCTION EXECUTION

(71) Applicant: International Business Machines Corporation, Armonk, NY (US)

(72) Inventors: Vijay Sundaresan, North York (CA); Mark Graham Stoodley, Markham (CA); Zhong Liang Wang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 16/565,560

(22) Filed: Sep. 10, 2019

(65) Prior Publication Data
US 2021/0073355 A1   Mar. 11, 2021

(51) Int. Cl.
| | |
|---|---|
| G06F 21/12 | (2013.01) |
| G06F 21/56 | (2013.01) |
| G06F 12/0804 | (2016.01) |
| G06F 9/30 | (2018.01) |

(52) U.S. Cl.
CPC ........ *G06F 21/125* (2013.01); *G06F 9/30145* (2013.01); *G06F 12/0804* (2013.01); *G06F 21/563* (2013.01); *G06F 2221/033* (2013.01)

(58) Field of Classification Search
CPC .............. G06F 21/125; G06F 9/30145; G06F 12/0804; G06F 21/563; G06F 2221/033; G06F 12/1483; G06F 2212/1016; G06F 2212/1052; G06F 2212/154; G06F 2212/313; G06F 2212/507; G06F 12/0868; G06F 21/54
See application file for complete search history.

(56) References Cited

U.S. PATENT DOCUMENTS

| | | | |
|---|---|---|---|
| 7,493,607 | B2 | 2/2009 | Moritz |
| 9,436,603 | B1* | 9/2016 | Pohlack ................ G06F 21/556 |
| 9,582,650 | B2 | 2/2017 | Chheda et al. |
| 2008/0052499 | A1 | 2/2008 | Koc |
| 2009/0089564 | A1 | 4/2009 | Brickell et al. |
| 2013/0326236 | A1 | 12/2013 | Chheda et al. |
| 2016/0012212 | A1 | 1/2016 | Moritz et al. |
| 2019/0318081 | A1* | 10/2019 | Gupta ................ G06F 9/30058 |
| 2021/0035654 | A1* | 2/2021 | Saroiu .................... G11C 29/32 |

OTHER PUBLICATIONS

"CPU hardware utilizing speculative execution may be vulnerable to cache side-channel attacks", Vulnerability Note VU#180049, Original Release date: May 21, 2018, Last revised: Jun. 19, 2018, 3 pages, <https://www.kb.cert.org/vuls/id/180049>.

"Speculative Execution Exploit Performance Impacts—Describing the performance impacts to security patches for CVE-2017-5754 CVE-2017-5753 and CVE-2017-5715", Updated Mar. 29, 2018 at 11:25 AM, 4 pages, <https://access.redhat.com/articles/3307751>.

(Continued)

*Primary Examiner* — Mohammad W Reza
(74) *Attorney, Agent, or Firm* — David Mattheis; Maeve Carpenter

(57) ABSTRACT

Improving execution of application program instructions by receiving code having a security classification, determining that the code is untrusted according to the security classification and inserting instructions for a cache flush associated with executing the code.

17 Claims, 4 Drawing Sheets

(56) References Cited

OTHER PUBLICATIONS

AMD, "Software Techniques for Managing Speculation on AMD Processors", White Paper, Revision Jan. 24, 2018, 8 pages, © 2018 Advanced Micro Devices, Inc., <https://developer.amd.com/wp-content/resources/Managing-Speculation-on-AMD-Processors.pdf>.

INTEL, "Speculative Execution Side Channel Mitigations", Revision 3.0, May 2018, Document No. 336996-003, 23 pages, <https://software.intel.com/sites/default/files/managed/c5/63/336996-Speculative-Execution-Side-Channel-Mitigations.pdf>.

Kocher et al., "Spectre Attacks: Exploiting Speculative Execution", arXiv:1801.01203v1 [cs.CR] Jan. 3, 2018, 16 pages, <https://spectreattack.com/spectre.pdf>.

Mell et al., "The NIST Definition of Cloud Computing", Recommendations of the National Institute of Standards and Technology, Special Publication 800-145, Sep. 2011, 7 pages.

\* cited by examiner

CONTROLLING PROCESSOR INSTRUCTION EXECUTION

BACKGROUND

The disclosure relates generally to managing the execution of processor instructions. The disclosure relates particularly to reducing system vulnerabilities by managing processor instruction execution.

Computer processors operate by loading program instructions from memory and subsequently executing the loaded instructions. Instructions may be executed in program order, or they may be executed out of order to increase program execution efficiency by reducing waiting times. Many programs contain branching instructions where subsequent instruction execution is tied to the outcome of decision instructions.

SUMMARY

Aspects of the invention disclose methods, systems and computer readable media associated with managing application execution. In one aspect, application instruction execution may include receiving code having a security classification, determining that the code is untrusted according to the security classification and inserting instructions for a cache flush associated with executing the code.

DETAILED DESCRIPTION

Figure 1:
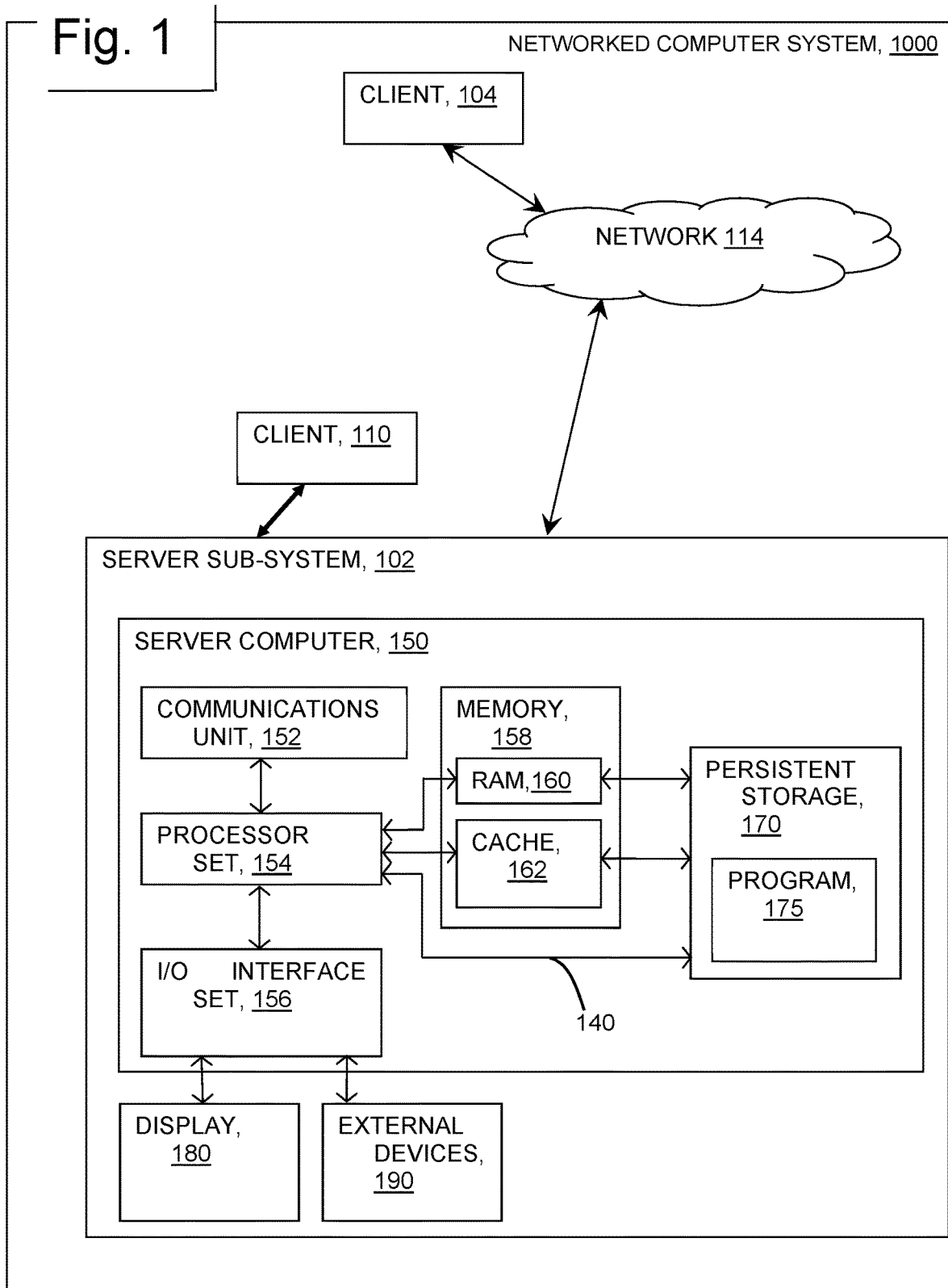
FIG. 1 provides a schematic illustration of a system, according to an embodiment of the invention.

Computer systems may be subject to direct attacks wherein the attacker seeks to gain a level of control over the system as a user, to directly alter properties or extract information. Defenses against such attacks are well known and include physical security protocols as well as password-based security methods.

Indirect attacks occur when a malicious actor seeks to extract valuable information from a system by creating program exception conditions and then speculatively reading the information from the system memory. One such attack includes commands to speculatively read unintended memory addresses. Such commands can lead to desired information being brought into cache despite the original unintended address.

Many processors perform speculative execution of instructions relating to branching instructions. A branching instruction is a decision point in the program where the next instructions executed depend upon the resolution of the decision. To increase operating efficiencies, systems can execute instructions along a predicted path from the decision block before the decision has been resolved. In this manner, once the decision is resolved and the prediction is correct, many of the next set of program instructions have already been executed and the program simply proceeds along the selected path. Results and pending commands from speculatively executed instructions associated with the paths which are not correctly predicted, are discarded.

Speculative instruction execution can create opportunities for malicious actors to extract information. Falsely predicted commands can be speculatively executed within the program stream. The false instructions can include if-then instructions which can lead to speculative execution of the 'then' portion of the instruction. Desired information can be brought into cache where it can be read by a malicious actor to deduce the sensitive data. As an example, a chain of READ commands directed toward an unintended memory address can be speculatively executed as part of the incorrectly predicted if-then path. Unintended memories are brought into the cache as the chain of READ commands are speculatively executed. Some of the data may then be available from the cache even after the READ commands are cancelled due to the resolution of the speculative branch in favor of another path. This data can then be accessed using known cache inference attacks to deduce the value in the original unintended memory. The cache inference attacks can measure the time taken to access memory, and differences in access timing can indicate that values were read from cache or the main memory. The difference in timing can be used to deduce the data previously brought into the cache by the incorrectly predicted speculative execution.

One remediation method to address such an attack is to alter the code, disabling all speculative execution associated with branching instructions. This method adds a serializing instruction that prevents the CPU from speculating by forcing the CPU to wait for the result of a branching command before proceeding. Such a solution eliminates the attacks but at the cost of the operating efficiencies (e.g., CPU performance is significantly reduced) associated with speculative execution of branching instructions. What is needed is a method for reducing any performance loss from remediating attacks based upon speculative execution of READ commands for unintended addresses.

A second remediation method to address such attacks is to alter the code by changing a control flow dependent load to a data dependent load. In this method, the branching instruction condition is used to form the addresses of relevant READ commands. The unintended address is replaced with an intended address and the contents of the unintended address are not brought into the cache.

The disclosed embodiments reduce the portion of executed code which must be remediated regarding potential attacks based upon speculative execution of READ commands. Application code is characterized as trusted or untrusted. Only untrusted code is subjected to remediation measures. Performance losses due to remediation measures are reduced as the portion of code which is trusted increases.

In the disclosed embodiments, application execution is managed to reduce performance losses associated with remediating attacks based upon speculative execution. In an embodiment, the system processor retrieves or receives executable code from storage. The code can be deployed application code, part of an application supporting code library, function-as-a-service code, or other code. The code can have a security classification in a security policy file of the system, such as a JAVA security policy file, specifying memory access permissions of the code. (Note: the term(s) "JAVA" may be subject to trademark rights in various jurisdictions throughout the world and are used here only in reference to the products or services properly denominated by the marks to the extent that such trademark rights may exist). In an embodiment, the security classification can provide that the code is trusted or untrusted. In one embodiment, only trusted code is identified using the security classification, untrusted code has no classification. In one embodiment, only untrusted code is identified; trusted code has no classification.

Code associated with deployed application and supporting libraries may be classified as trusted by default. Similarly, code stored in some system locations, such as in boot, user, or system directories, may be classified as trusted by default. As an example, code located in jars/directories associated with particular JAVA virtual machine or compiler classpaths may be defined as trusted by default.

The code may be categorized and identified as trusted or untrusted at a basic code block level. In an embodiment, the basic code block level can be at a per-class level in a JAVA environment. Similar basic code block levels may be used in other programming environments. Specifying the code classification at a per-class level allows the system to address attack threats more particularly. Trusted code does not represent an attack threat, so there is no need to remediate trusted code. Untrusted code may represent an attack threat. Transitioning to untrusted code also represents a potential threat related to cache contents at the time of the transition. With code classified on a per-class basis, the invocation of a method represents the execution point at which a transition to untrusted code may occur.

A call (direct, indirect, or unresolved) from a trusted method to an untrusted method, a return from a trusted method to an untrusted method, and a in-line transition from a trusted method to an untrusted method, each represent a potential threat related to cache contents at the transition point.

The cache flush instructions inserted by the compiler prior to the execution of untrusted code can reduce the threat posed by the code. For a call, inserting cache flush execution instructions prior to starting the untrusted method eliminates the threat. Similarly, inserting cache flush instructions after the return and before the untrusted method eliminates the threat. Returning from a trusted method does not pose a threat and the cache flush can be eliminated in such circumstances when a bit associated with the security classification of the callee is set for trusted callees (The callee is the object of a function call by a method). Upon the return, checking this bit provides an indication of the security classification of the callee and the system can then insert the cache flush only when the callee is untrusted. For a transition from a caller to an inline callee method, the change in security classification from trusted to untrusted is recognized by the compiler and cache flush instructions are inserted at the transition from the trusted to the untrusted code portions.

In addition to a cache flush executed before starting the untrusted method execution, remediation methods, as described above, can be implemented during the execution of the untrusted method code. The remediation implementation ceases when execution transitions back to trusted code from untrusted code. As described, the first and second remediation methods alter the untrusted code to prevent speculative execution or to eliminate the reading of unintended address content into the cache. The altered code is then issued and executed.

In an embodiment, all code may be classified as untrusted by default. As code is received and executed, the system monitors the execution and tracks the use of attack remediation methods. Cache flush instructions can be inserted at each method transition during the execution. Code blocks (methods) which execute without remediation are reclassified as trusted. Subsequent executions of such blocks proceed without remediation as described above.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise software programs (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory 160 (RAM). In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the execution management program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., execution management program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
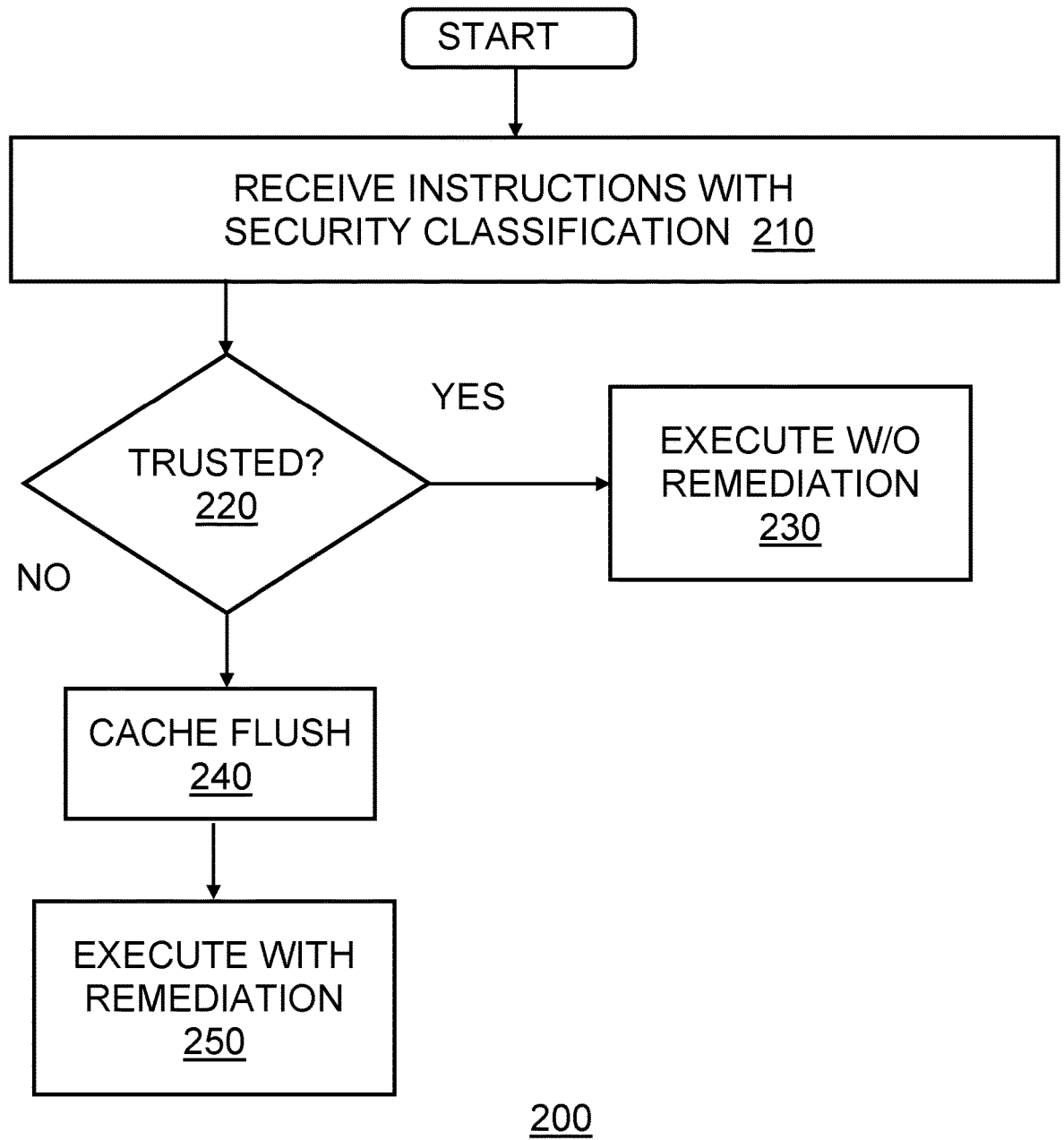
FIG. 2 provides a flowchart depicting an operational sequence, according to an embodiment of the invention.

FIG. 2 provides a flowchart 200, illustrating exemplary activities associated with the practice of the disclosure. Reference is made to system elements depicted in FIG. 1 as well. After program start, at 210, the processor set 154, receives code for execution from memory 158 and program 175 in persistent storage 170. The code includes an associated security classification. At 220, the security classification is checked. At 230, trusted code is executed without remediation and without a cache flush prior to starting. At 240, a cache flush instruction is inserted prior to starting the execution of the untrusted code. At 250 the untrusted code executes with remediation. The cache flush refers to clearing the contents of cache 162 of memory 158.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
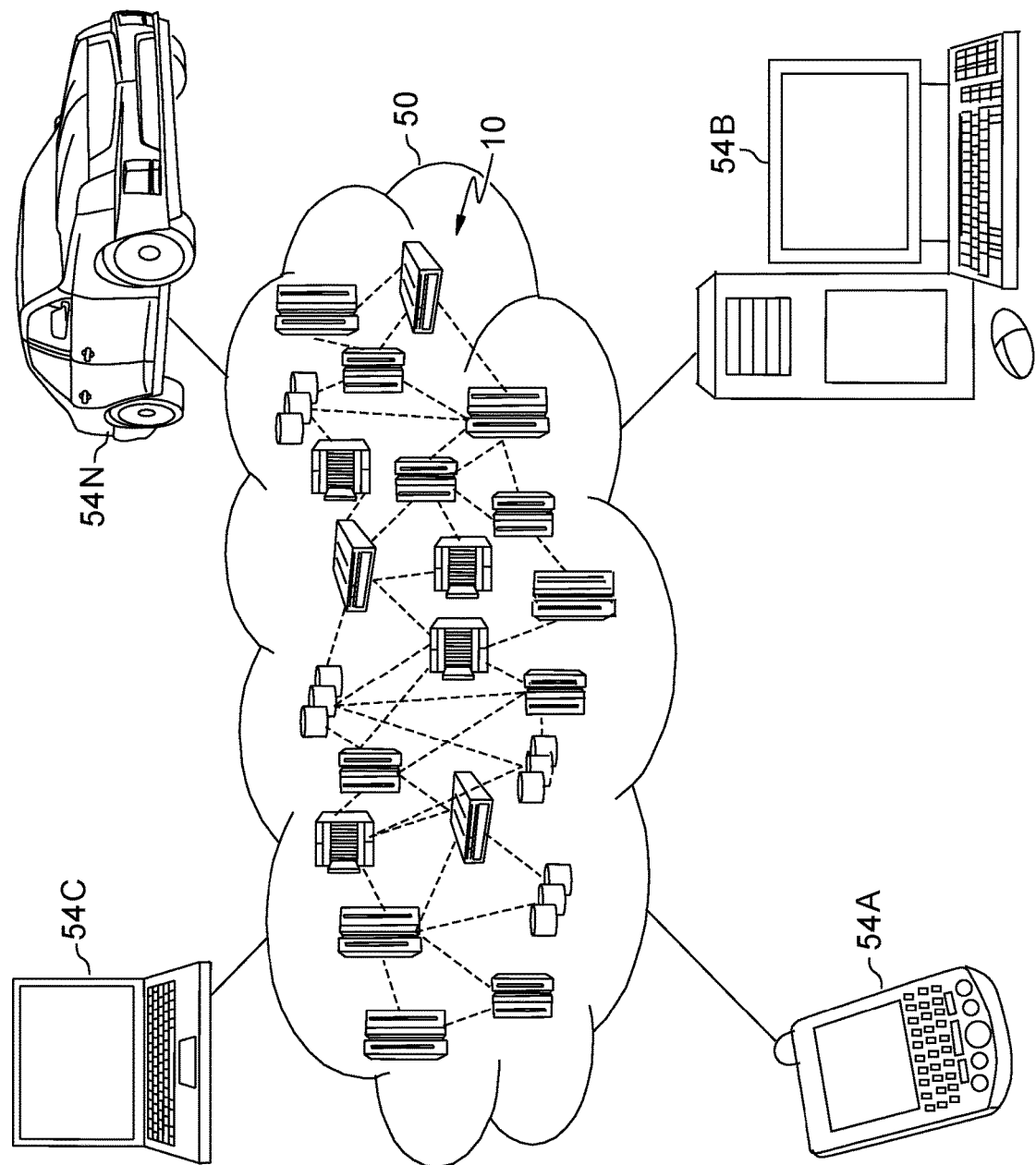
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
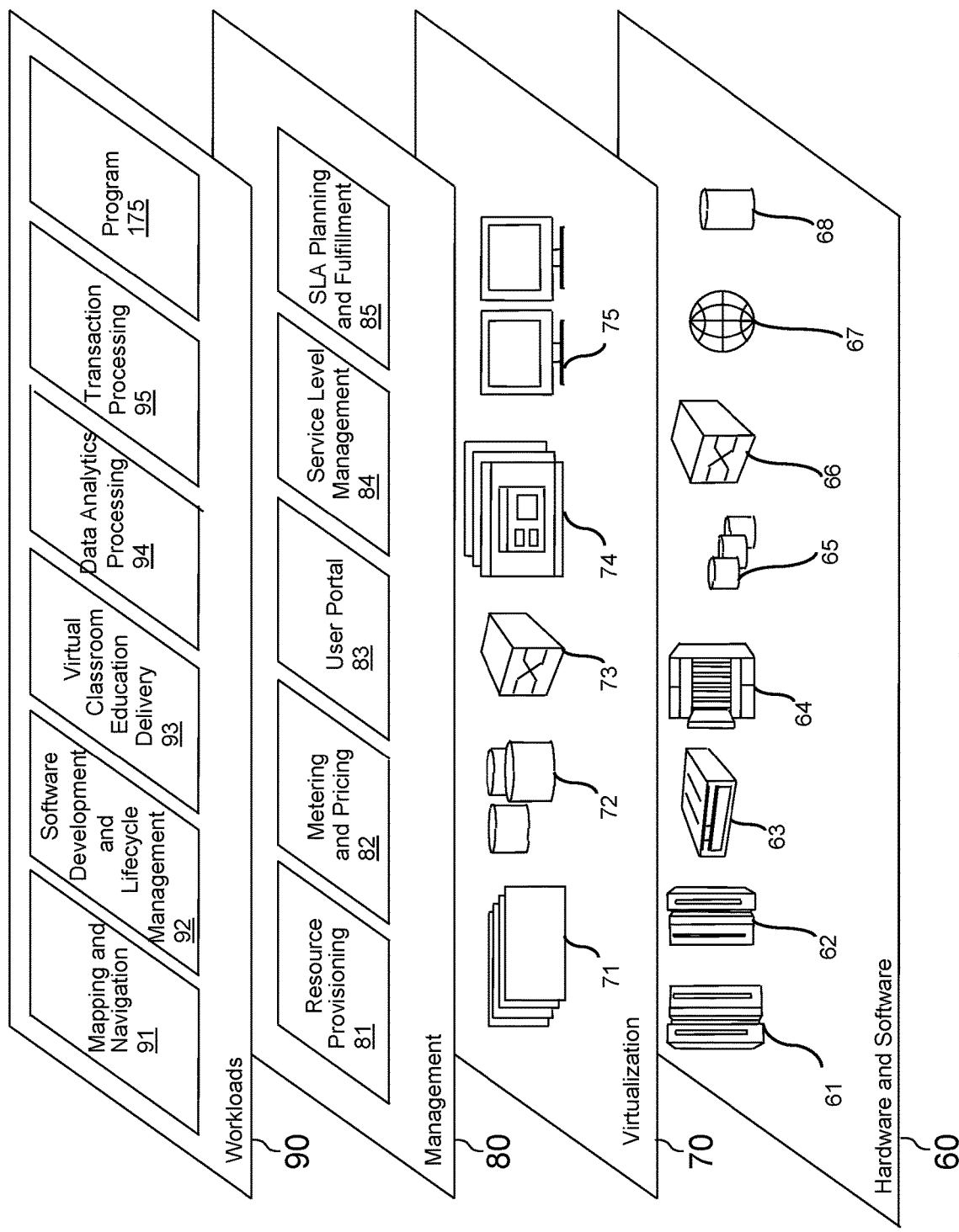
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and execution management program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing application execution, the method comprising:
    receiving, by one or more computer processors, code having a security classification;
    determining, by the one or more computer processors, that the code is untrusted according to the security classification; and
    inserting, by the one or more computer processors, cache flush instructions for a cache flush associated with executing the code, the cache flush instructions selected from a group consisting of: inserting instructions for the cache flush at a start of an untrusted method, inserting instructions for the cache flush after a method call has returned, and inserting instructions for the cache flush before transitioning to a code portion containing untrusted code.

2. The computer implemented method according to claim 1, further comprising:
    defining, by the one or more computer processors, a basic unit of code having the security classification.

3. The computer implemented method according to claim 2, wherein the basic unit of code having the security classification comprises a class.

4. The computer implemented method according to claim 1, further comprising:
    altering, by the one or more computer processors, untrusted code; and
    executing the untrusted code by the one or more computer processors.

5. The computer implemented method according to claim 1, further comprising:
    setting code security classification according to code system location by the one or more computer processors.

6. The computer implemented method according to claim 1, further comprising:
    altering, by the one or more computer processors, untrusted code; and
    executing, by the one or more computer processors, the untrusted code;
    wherein inserting cache flush instructions associated with executing the code comprises an insertion selected from a group consisting of: inserting instructions for the cache flush at a start of an untrusted method, inserting instructions for the cache flush after a method call has returned, and inserting instructions for the cache flush before transitioning to a code portion containing the untrusted code.

7. A computer program product for managing application execution, the computer program product comprising one or more computer readable storage devices and program instructions stored on the one or more computer readable storage devices, the stored program instructions comprising:

program instructions for receiving code having a security classification;

program instructions for determining that the code is untrusted according to the security classification; and program instructions for inserting cache flush instructions for a cache flush associated with executing the code, the cache flush instructions selected from a group consisting of: inserting instructions for the cache flush at a start of an untrusted method, inserting instructions for the cache flush after a method call has returned, and inserting instructions for the cache flush before transitioning to a code portion containing untrusted code.

8. The computer program product according to claim 7, the stored program instructions further comprising:

program instructions for defining a basic unit of code having the security classification.

9. The computer program product according to claim 8, wherein the basic unit of code having the security classification comprises a class.

10. The computer program product according to claim 7, the stored program instructions further comprising:

program instructions for altering untrusted code; and
program instructions for executing the untrusted code.

11. The computer program product according to claim 7, the stored program instructions further comprising:

program instructions for setting code security classification according to code system location.

12. The computer program product according to claim 7, the stored program instructions further comprising:

program instructions for altering untrusted code; and
program instructions for executing the untrusted code;
wherein inserting cache flush instructions associated with executing the code comprises an insertion selected from a group consisting of: inserting instructions for the cache flush at a start of an untrusted method, inserting instructions for the cache flush after a method call has returned, and inserting instructions for the cache flush before transitioning to a code portion containing the untrusted code.

13. A computer system for managing application execution, the computer system comprising:

one or more computer processors;
one or more computer readable storage devices;
program instructions stored on the one or more computer readable storage devices for execution by the one or more computer processors, the stored program instructions comprising:

program instructions for receiving code having a security classification;

program instructions for determining that the code is untrusted according to the security classification; and program instructions for inserting cache flush instructions for a cache flush associated with executing the code, the cache flush instructions selected from a group consisting of: inserting instructions for the cache flush at a start of an untrusted method, inserting instructions for the cache flush after a method call has returned, and inserting instructions for the cache flush before transitioning to a code portion containing untrusted code.

14. The computer system according to claim 13, the stored program instructions further comprising:

program instructions for defining a basic unit of code having the security classification.

15. The computer system according to claim 13, the stored program instructions further comprising:

program instructions for altering untrusted code; and
program instructions for executing the untrusted code.

16. The computer system according to claim 13, the stored program instructions further comprising:

program instructions for setting code security classification according to code system location.

17. The computer system according to claim 13, the stored program instructions further comprising:

program instructions for altering untrusted code; and
program instructions for executing the untrusted code;
wherein inserting cache flush instructions associated with executing the code comprises an insertion selected from a group consisting of: inserting instructions for the cache flush at a start of an untrusted method, inserting instructions for the cache flush after a method call has returned, and inserting instructions for the cache flush before transitioning to a code portion containing the untrusted code.

\* \* \* \* \*